(12) United States Patent
Miller

(10) Patent No.: US 7,423,802 B2
(45) Date of Patent: Sep. 9, 2008

(54) ILLUMINATION MODULE

(75) Inventor: Gregory D. Miller, Sunnyvale, CA (US)

(73) Assignee: Collinear Corporation, Santa Clara, CA (US)

( * ) Notice: Subject to any disclaimer, the term of this patent is extended or adjusted under 35 U.S.C. 154(b) by 0 days.

(21) Appl. No.: 11/897,530

(22) Filed: Aug. 29, 2007

(65) Prior Publication Data

US 2008/0055714 A1    Mar. 6, 2008

Related U.S. Application Data

(63) Continuation-in-part of application No. 11/143,881, filed on Jun. 1, 2005, now Pat. No. 7,265,896.

(60) Provisional application No. 60/841,109, filed on Aug. 29, 2006.

(51) Int. Cl.
*G02F 1/35* (2006.01)
*G02B 6/12* (2006.01)

(52) U.S. Cl. .................. 359/326; 359/328; 385/14; 385/37

(58) Field of Classification Search ......... 359/326–330; 385/14, 37
See application file for complete search history.

(56) References Cited

U.S. PATENT DOCUMENTS

| | | | |
|---|---|---|---|
| 4,784,450 A | 11/1988 | Jain et al. | |
| 6,041,072 A | 3/2000 | Ventrudo et al. | |
| 6,480,325 B1 | 11/2002 | Batchko et al. | |
| 6,845,186 B2 * | 1/2005 | Oikawa et al. | ............... 385/14 |
| 6,930,821 B2 | 8/2005 | Kurz et al. | |
| 2006/0132901 A1 | 6/2006 | Miller | |

* cited by examiner

*Primary Examiner*—Hemang Sanghavi
(74) *Attorney, Agent, or Firm*—Carr & Ferrell LLP

(57) ABSTRACT

An illumination module may provide light in a plurality of colors including Red-Green-Blue (RGB) light and/or white light. The light from the illumination module may be directed to a 3LCD system, a Digital Light Processing (DLP®) system, a Liquid Crystal on Silicon (LCoS) system, or other micro-display or micro-projection systems. In one embodiment the illumination module includes a laser configured to produce an optical beam at a first wavelength, a planar lightwave circuit coupled to the laser and configured to guide the optical beam, and a waveguide optical frequency converter coupled to the planar lightwave circuit and configured to receive the optical beam at the first wavelength, convert the optical beam at the first wavelength into an output optical beam at a second wavelength, and may provide optically coupled feedback which is nonlinearly dependent on a power of the optical beam at the first wavelength to the laser.

25 Claims, 12 Drawing Sheets

ILLUMINATION MODULE

CROSS-REFERENCE TO RELATED APPLICATIONS

This application is a continuation-in-part of U.S. application Ser. No. 11/143,881 entitled "Optical Power Combining for Optical Frequency Conversion Having Nonlinear Feedback" filed on Jun. 1, 2005, now U.S. Pat. No. 7,265,896 and claims the benefit of U.S. Provisional Application No. 60/841,109 entitled "Illumination Module" and filed on Aug. 29, 2006, the disclosures of which are hereby incorporated by reference.

BACKGROUND OF THE INVENTION

1. Field of the Invention

The present invention relates generally to light sources, and more particularly to an illumination module based on optical power combining to provide pump radiation to an optical frequency converter.

2. Related Art

Many optical processes of used in various illuminator applications generally show improved performance as the input optical power increases. For example, the efficiency of second harmonic generation (SHG) increases as the input power increases. Thus, providing high optical power may be desirable. High optical power may be provided by a single high power source, or by effectively combining the outputs of two or more low power sources to provide a high power combined output. This second approach is generally referred to as optical power combining.

In many cases, it is desirable for the combined output radiation to be in a single spatial mode. However, imposing the requirement of a single spatial mode on a combined output has significant consequences for optical power combining. In particular, interference between the optical inputs may occur in the combined single mode output unless the optical inputs are distinguishable (e.g., have different wavelengths and/or different states of polarization). In order to obtain power combining of interfering optical inputs, phase coherence of these optical inputs must be established, which typically requires implementation of an elaborate optical phase locking scheme. Accordingly, in applications that permit the use of distinguishable optical inputs, combination of such distinguishable inputs is usually preferred. Such power combiners are often referred to as wavelength combiners, since radiation at different wavelengths is combined into a single spatial mode combined output. As used herein, optical power combining is understood to include both wavelength combining and/or polarization combining.

A typical wavelength combiner has two or more input ports and a single output port, where each input port i has a corresponding wavelength acceptance range $\Delta\lambda_i$ which is efficiently coupled to the output port. The wavelength ranges $\Delta\lambda_i$ are generally substantially non-overlapping. One way to utilize such a wavelength combiner to combine the outputs of several lasers is to provide each laser with a separate input port, such that each laser has a fixed emission wavelength within the acceptance range $\Delta\lambda$ for the corresponding input port. While this approach is straightforward, it suffers from the disadvantage that providing lasers having emission wavelengths within the specified ranges may be costly in cases where the ranges are narrow. This cost issue is especially notable in cases where a large number of lasers are to be combined.

An alternative approach uses diode lasers and optical power combining and provides each diode laser with an input port, where each laser has an emission wavelength which may be in any of the wavelength ranges $\Delta\lambda_j$. Diode lasers tend to have a broad gain bandwidth, and the use of such lasers, for example Fabry-Perot diode lasers, is well known in the art. In this approach, a broadband partial reflector is optically coupled to the output port of the wavelength combiner. The combination of wavelength combiner and reflector provides wavelength-dependent feedback to each laser source. This linear feedback acts to set the emission wavelength of each laser source appropriately for wavelength combining. For example, a laser source coupled to a port j having an acceptance range $\Delta\lambda_j$ will receive more feedback in the range $\Delta\lambda_j$ than at other wavelengths, which will tend to force this source to lase at a wavelength within the range $\Delta\lambda_j$. With this approach, multiple diode lasers may be wavelength combined without the need for precise wavelength control of each laser diode.

However, certain problems which may arise in the context of wavelength combining are not addressed by the above approaches. When either of the-above approaches is used, for example, in the context of wavelength combining to provide pump radiation for a parametric nonlinear optical process which is efficient over a relatively broad wavelength range, the resulting pump radiation has a pump spectrum that is independent of the nonlinear optical process conversion efficiency. Since the pump spectrum remains fixed, careful and costly design of the broadband optical frequency converter may be required to obtain roughly constant conversion efficiency within the desired wavelength range.

There is, therefore, a need for an illumination module based on optical power combining for providing pump radiation to an optical frequency converter that automatically equalizes conversion efficiency within a conversion wavelength range.

SUMMARY

An illumination module may provide light in a plurality of colors including Red-Green-Blue (RGB) light and/or white light. The light from the illumination module may be directed to a 3LCD system, a Digital Light Processing (DLP®) system, a Liquid Crystal on Silicon (LCoS) system, or other micro-display or micro-projection systems.

One embodiment of the invention includes a system comprising a laser configured to produce an optical beam at a first wavelength, a planar lightwave circuit coupled to the laser and configured to guide the optical beam, and a waveguide optical frequency converter coupled to the planar lightwave circuit, and configured to receive the optical beam at the first wavelength, convert the optical beam at the first wavelength into an output optical beam at a second wavelength, and provide optically coupled feedback which is nonlinearly dependent on the power of the optical beam at the first wavelength to the laser.

Another embodiment of the invention includes a system comprising a substrate, a laser diode array disposed on the substrate and configured to emit a plurality of optical beams at a first wavelength, a planar lightwave circuit disposed on the substrate and coupled to the laser diode array, and configured to combine the plurality of optical beams and produce a combined optical beam at the first wavelength, and a nonlinear optical element disposed on the substrate and coupled to the planar lightwave circuit, and configured to convert the combined optical beam at the first wavelength into an optical beam at a second wavelength using nonlinear frequency conversion, and provide optically coupled feedback which is nonlinearly dependent on a power of the combined optical beam at the first wavelength to the laser diode array.

Another embodiment of the invention includes a system comprising a semiconductor laser array configured to produce a plurality of optical beams at a first wavelength, an arrayed waveguide grating coupled to the semiconductor laser array and configured to combine the plurality of optical beams and output a combined optical beam at the first wavelength, a quasi-phase matching wavelength-converting waveguide coupled to the arrayed waveguide grating and configured to use second harmonic generation to produce an output optical beam at a second wavelength based on the combined optical beam at the first wavelength.

DETAILED DESCRIPTION

An illumination module using wavelength combining and nonlinear frequency conversion with nonlinear feedback to the source provides a source of high-brightness, long-life, speckle-reduced or speckle-free light. Various embodiments of the invention may provide light in a plurality of colors including Red-Green-Blue (RGB) light and/or white light. The light from the illumination module may be directed to a 3LCD system, a Digital Light Processing (DLP®) system, a Liquid Crystal on Silicon (LCoS) system, or other microdisplay or micro-projection systems.

Power is obtained from within a wavelength conversion device and fed back to the source. The feedback power has a nonlinear dependence on the input power provided by the source to the wavelength conversion device. Nonlinear feedback may reduce the sensitivity of the output power from the wavelength conversion device to variations in the nonlinear coefficients of the device because the feedback power increases if a nonlinear coefficient decreases. The increased feedback tends to increase the power supplied to the wavelength conversion device, thus mitigating the effect of the reduced nonlinear coefficient.

Figure 1:
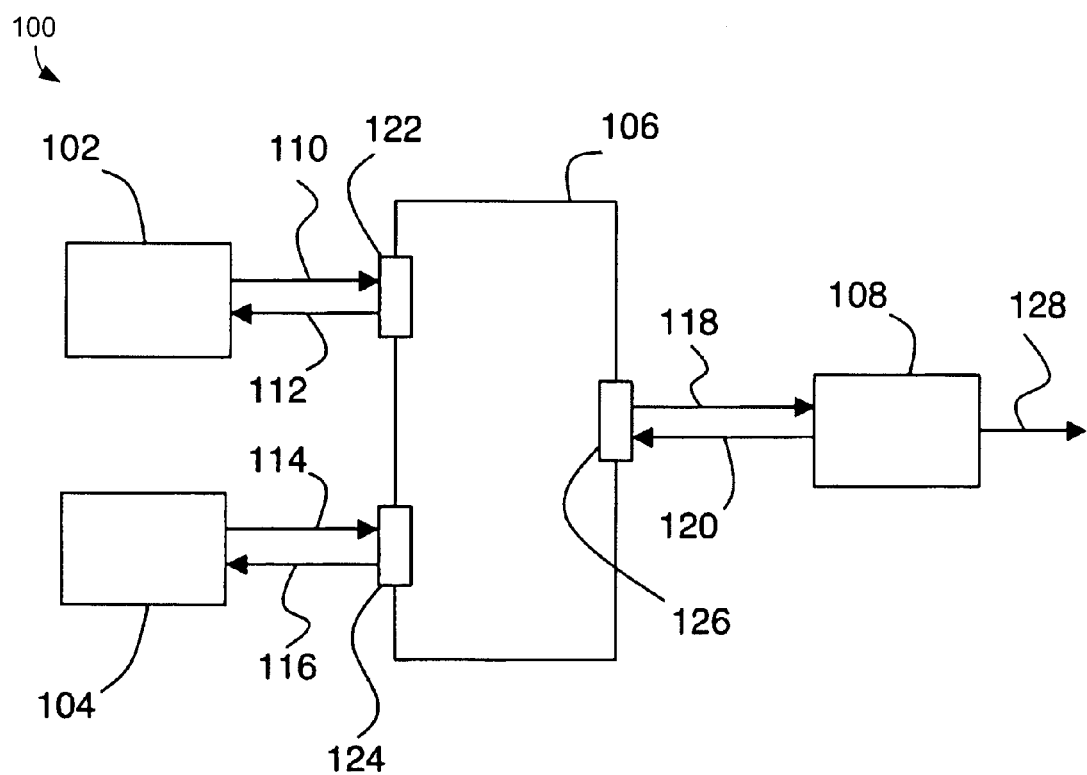
FIG. 1 is a block diagram of an illumination module, according to an embodiment of the invention.

FIG. 1 is a block diagram of an illumination module, according to an embodiment of the invention. Illumination module 100 comprises an optical source, a combiner, and an optical frequency converter, according to an embodiment of the invention. An optical source 102 emits optical radiation 110 toward an input port 122 of a combiner 106. Similarly, another optical source 104 emits optical radiation 114 toward another input port 124 of combiner 106. Combiner 106 has a combiner output port 126, which emits combined radiation 118. Combined radiation 118 is received by an optical frequency converter 108, which provides output optical radiation 128. Optical frequency converter 108 also provides feedback radiation 120 to combiner output port 126. Combiner 106 splits feedback radiation 120 to provide source feedback radiation 112 emitted from input port 122 and source feedback radiation 116 emitted from input port 124. Source feedback radiation 112 is received by optical source 102, and source feedback radiation 116 is received by optical source 104. Optical radiation 110 and source feedback radiation 112 between optical source 102 and combiner 106 may propagate in any combination of free space and/or guiding structure (e.g., an optical fiber or any other optical waveguide). Optical radiation 114, source feedback radiation 116, combined radiation 118 and feedback radiation 120 may also propagate in any combination of free space and/or guiding structure.

Suitable optical sources 102 and 104 include any source of optical radiation having an emission wavelength that is influenced by optical feedback. Such sources include lasers, and may be semiconductor diode lasers. For example, optical sources 102 and 104 may be elements of an array of semiconductor lasers. Sources other than lasers may also be employed (e.g., an optical frequency converter may be used as a source). Although two sources are shown on FIG. 1, the invention may also be practiced with more than two sources. Combiner 106 is shown in general terms as a three port device having ports 122, 124, and 126. Although ports 122 and 124 are referred to as input ports, and port 126 is referred to as a combiner output port, these ports are generally bidirectional and may both receive and emit optical radiation as indicated above. For example, if combiner 106 is fiber (or waveguide) coupled, then the input and output fibers (or waveguides) act as ports 122, 124, and 126, and such ports are clearly bidirectional. In general, there is a one to one correspondence between input ports and sources to be combined, so if N sources are being combined, the combiner has N corresponding input ports.

Combiner 106 may include a wavelength dispersive element and optical elements to define the ports. Suitable wavelength dispersive elements include arrayed waveguide gratings, reflective diffraction gratings, transmissive diffraction gratings, holographic optical elements, assemblies of wavelength-selective filters, and photonic band-gap structures. Thus, combiner 106 may be a wavelength combiner, where each of the input ports i has a corresponding input port wavelength range $\Delta\lambda_i$ for efficient coupling to the combiner output port. The wavelength ranges $\Delta\lambda_i$ are substantially non-overlapping. In various embodiments, each of the ports may be a single spatial mode port to avoid losses associated with partitioning of optical power among several spatial modes.

Various optical processes may occur within optical frequency converter 108, including but not limited to harmonic generation, sum frequency generation (SFG), second harmonic generation (SHG), difference frequency generation, parametric generation, parametric amplification, parametric oscillation, three-wave mixing, four-wave mixing, stimulated Raman scattering, stimulated Brillouin scattering, stimulated emission, acousto-optic frequency shifting and/or electro-optic frequency shifting.

In general, optical frequency converter 108 accepts optical inputs at an input set of optical wavelengths and provides an optical output at an output set of optical wavelengths, where the output set differs from the input set.

Optical frequency converter 108 may include nonlinear optical materials such as lithium niobate, lithium tantalate, potassium titanyl phosphate, potassium niobate, quartz, silica, silicon oxynitride, gallium arsenide, lithium borate, and/or beta-barium borate. Optical interactions in optical frequency converter 108 may occur in various structures including bulk structures, waveguides, quantum well structures, quantum wire structures, quantum dot structures, photonic bandgap structures, and/or multi-component waveguide structures.

In cases where optical frequency converter 108 provides a parametric nonlinear optical process, this nonlinear optical process is preferably phase-matched. Such phase-matching may be birefringent phase-matching or quasi-phase-matching. Quasi-phase matching may include methods disclosed in U.S. Pat. No. 7,116,468 to Miller, the disclosure of which is hereby incorporated by reference.

Poling of a ferroelectric material to provide poled domains is one approach for providing quasi-phase-matching. Such poled domains may be periodic or aperiodic. Aperiodic poling may be used to alter the phase-matching bandwidth in a controllable manner. For example, broadband quasi-phase-matching (i.e., having a phase-matching wavelength full-width-half-maximum (FWHM) bandwidth greater than about 0.01% of an input optical wavelength) may be provided by aperiodic poling.

Optical frequency converter 108 may also include various elements to improve its operation, such as a wavelength selective reflector for wavelength selective output coupling, a wavelength selective reflector for wavelength selective resonance, and/or a wavelength selective loss element for controlling the spectral response of the converter.

Figure 2:
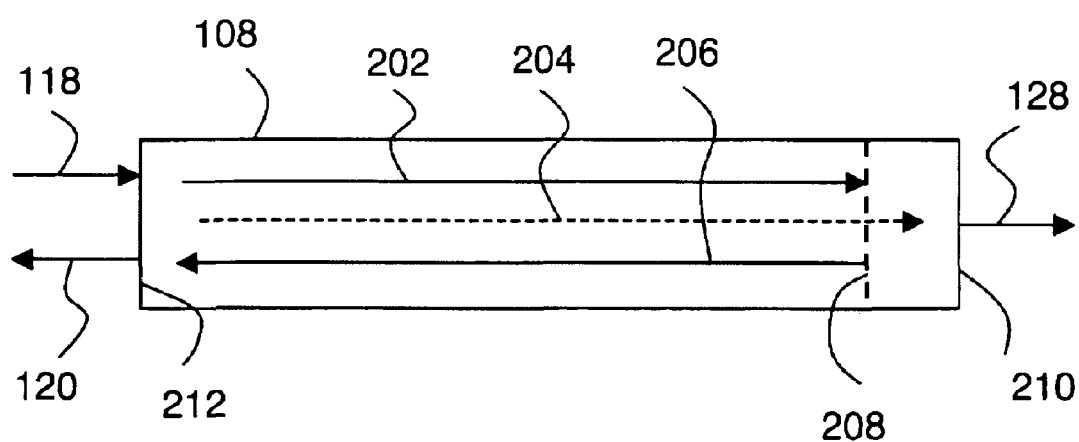
FIG. 2 is a block diagram of an optical frequency converter, according to an embodiment of the invention.

FIG. 2 is a block diagram of an optical frequency converter, according to an embodiment of the invention. FIG. 2 illustrates how feedback radiation 120 is provided by an exemplary optical frequency converter 108 which provides parametric frequency conversion. Combined radiation 118 provides forward radiation 202 within optical frequency converter 108. Forward radiation 202 propagates to the right on FIG. 2, and parametric radiation 204, also propagating to the right on FIG. 2, is generated within optical frequency converter 108. Parametric radiation 204 is emitted from optical frequency converter 108 as output optical radiation 128. Typically there is a net power transfer from forward radiation 202 to parametric radiation 204 as the interaction proceeds (i.e., as the radiation propagates to the right in this example). A reflector 208 is disposed in optical frequency converter 108 to reflect (or partially reflect) forward radiation 202 to provide backward radiation 206.

In some cases it is desirable to dispose reflector 208 externally to optical frequency converter 108, after endface 210. Backward radiation 206 is emitted from optical frequency converter 108 as feedback radiation 120. Reflector 208 may be wavelength dependent, such that parametric radiation 204 is transmitted through reflector 208 with greater efficiency than forward radiation 202. In some cases the desired power reflectivity of reflector 208 for forward radiation 202 will be sufficiently low (e.g., 1% or less) that there is no need to provide significantly higher transmittance for parametric radiation 204 than for forward radiation 202. Reflector 208 may be a grating, an internal interface, a coated or uncoated endface, or any combination thereof. The preferred level of reflectivity for reflector 208 is greater than 90%.

The forward power (i.e., power of forward radiation 202) incident on reflector 208 will depend on the efficiency of the parametric nonlinear process in this example. More specifically, as the process efficiency increases, the forward power decreases due to pump depletion. Accordingly, the backward power (i.e., power of backward radiation 206) and the feedback power also depend on the process efficiency. This situation is referred to herein as "nonlinear feedback." Note that the position of reflector 208 determines how nonlinear the feedback is. For example, a reflector located at an input interface 212 provides purely linear feedback (i.e., feedback that does not depend on the process efficiency). A reflector located at an endface 210 provides a maximum degree of nonlinear feedback, since the dependence of forward power on process efficiency is maximized at the output interface (assuming a phase-matched parametric interaction).

In the case where the combiner has N input ports, each indexed with an integer i, the optical sources each provide source radiation having an input power $P_i$ to each port i. At least one of these sources will also receive feedback radiation having a power $F_i$ from port i (i.e., at least one $F_i$ is non-zero). Typically, the embodiment of FIG. 1 is operated at a nominal operating point, where each source i provides a nominal operating power $OP_i$ to its corresponding port. Both the source radiation and the feedback radiation may include one or several optical wavelengths or wavelength ranges. The wavelengths of the source and feedback radiation may be the same or they may be different.

Figure 3:
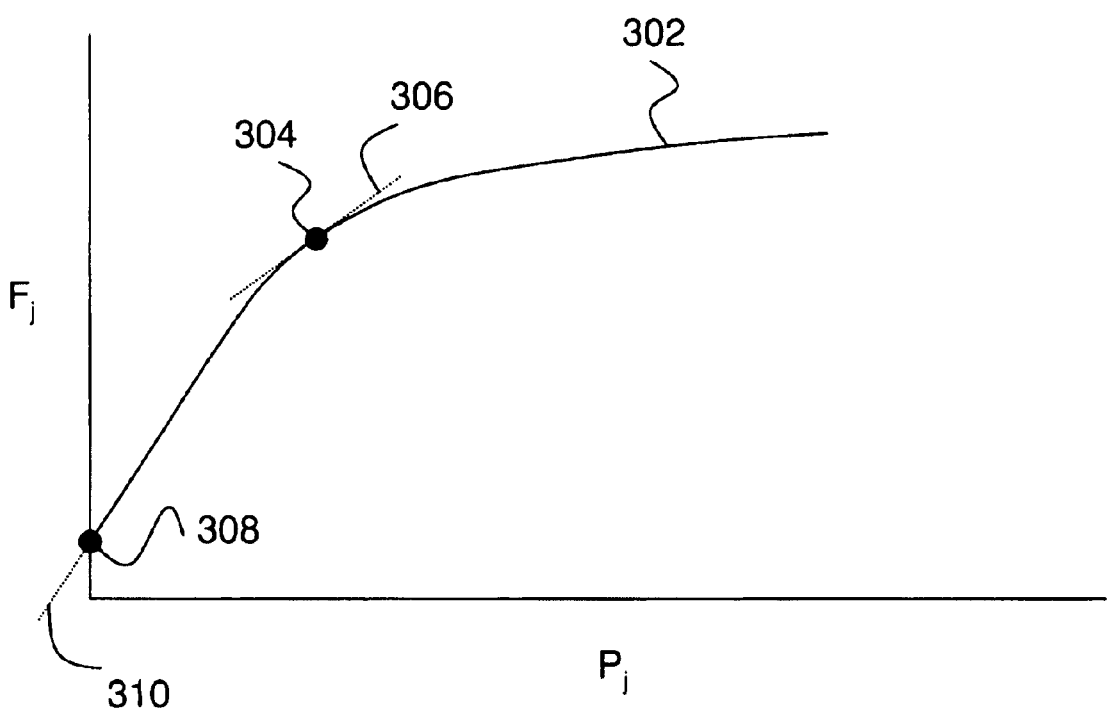
FIG. 3 is a graph of feedback power $F_j$ vs. input power $P_j$ for a port j in an embodiment of the invention.

FIG. 3 is a graph of feedback power $F_j$ vs. input power $P_j$ for a port j in an embodiment of the invention. In FIG. 3, the dependence of feedback power $F_j$ on input power $P_j$ for a selected port j is shown, where $P_i = OP_i$ for $i \neq j$ is assumed (i.e., inputs to ports other than port j are assumed to be nominal). When $P_j$ is zero, $F_j$ may be non-zero (as shown by point 308 on FIG. 3), since inputs to ports other than port j may contribute to $F_j$ even when $P_j$ is zero (e.g., by nonlinear scattering). For $P_j$ close to zero, the dependence of $F_j$ on $P_j$ is approximately linear, as expected from a first order Taylor expansion. The slope of line 310 is given by the partial derivative $\partial F_j / \partial P_j$ evaluated at $P_j = 0$. As indicated above in connection with FIG. 2, the dependence of $F_j$ on $P_j$ may be nonlinear. For example, suppose the nominal value of $P_j$ (i.e., $P_j = OP_j$) corresponds to point 304 on FIG. 3, where curve 302 has clearly departed from its linear behavior for $P_j$ near zero. This nonlinearity may be expressed in terms of the slope of line 306, which is given by the partial derivative $\partial F_j / \partial P_j$ evaluated at $P_j = OP_j$. The nominal operating point features nonlinear feedback to source j if the slopes of lines 306 and 310 differ (i.e., if $\partial F_j / \partial P_j$ evaluated at $P_j = OP_j$ differs from $\partial F_j / \partial P_j$ evaluated at $P_j = 0$).

Various embodiments of the invention have such nonlinear feedback with respect to at least one of the sources, and in many embodiments, to all of the sources. Nonlinear feedback may provide spectrally homogeneous pumping of a broadband wavelength converting process, since spectral portions of the input pump radiation that are less efficiently converted will tend to experience greater feedback. This enhanced feedback may lend to increased pump power in such spectral regions, thereby increasing conversion efficiency. In this manner, automatic equalization of conversion efficiency may be obtained.

Figure 4:
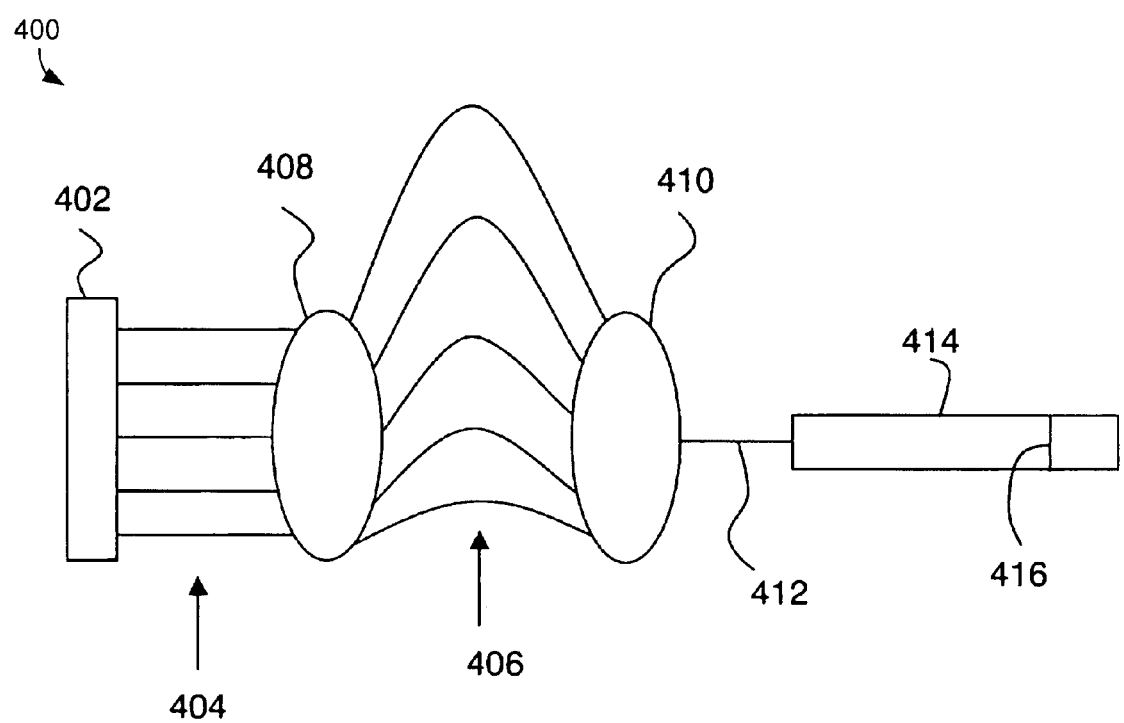
FIG. 4 is a block diagram of a laser illumination module, according to an embodiment of the invention.

FIG. 4 is a block diagram of a laser illumination module, according to an embodiment of the invention. Laser illumination module 400 comprises an array of diode lasers 402, waveguides 404 and 406, star couplers 408 and 410 and optical frequency converter 414. An array of diode lasers 402 has lasing elements in one to one correspondence with (and coupled to) waveguides 404. Each of waveguides 404 acts as an input port (such as ports 122 and 124 on FIG. 1). Waveguides 404 are coupled to a planar waveguide star coupler 408. Star coupler 408 is coupled to another planar waveguide star coupler 410 by waveguides 406 which have different lengths. The combination of star couplers 408 and 410 with waveguides 406 may be an arrayed waveguide grating, and acts as a wavelength combiner (e.g., combiner 106 on FIG. 1) providing combined radiation 118 to waveguide 412. Waveguide 412 provides combined radiation 118 to optical frequency converter 414. Within optical frequency converter 414, an optional reflector 416 provides a back reflection of combined radiation 118. As indicated above in connection with FIGS. 2 and 3, this back reflection provides nonlinear feedback according to embodiments of the invention.

One or more of the elements described with reference to FIG. 4 may be fabricated on a common substrate using planar coating methods and/or lithography methods. Using these methods on a common substrate may reduce parts count and alignment requirements, which may reduce the cost of the illumination module.

Figure 5:
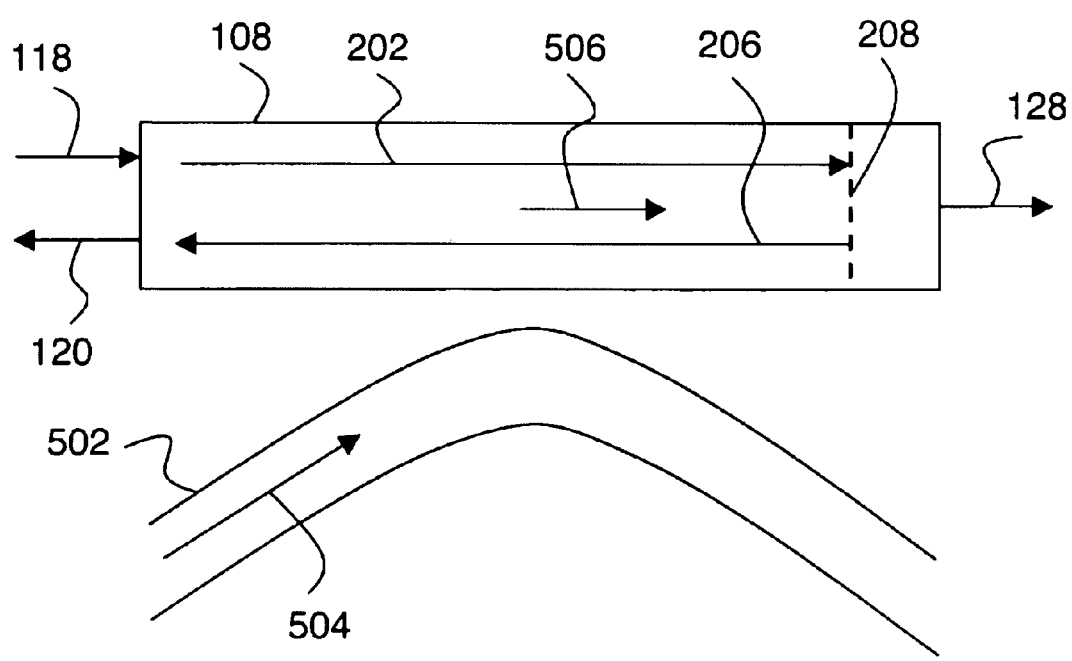
FIG. 5 is a block diagram of an optical frequency converter including a directional coupler, according to an embodiment of the invention.

FIG. 5 is a block diagram of an optical frequency converter including a directional coupler, according to an embodiment of the invention. In this example, optical frequency converter 108 is a waveguide device, which enables pumping schemes in addition to those available for bulk devices. In this embodiment, combined radiation 118 is coupled into optical frequency converter 108 as discussed in connection with FIG. 2 (e.g., through a waveguide endface). Additional pump radiation is provided to optical frequency converter 108 with a directional coupler. More specifically, a second waveguide 502 is disposed such that its core is in close proximity with the core of the waveguide in optical frequency converter 108. As is known in the art, this arrangement of waveguides functions as a directional coupler, such that radiation 504 in waveguide 502 may provide additional radiation 506 in optical frequency converter 108.

In such an arrangement, it is generally desirable to prevent significant coupling of forward radiation 202 from optical frequency converter 108 to waveguide 502. Such coupling may be avoided by providing radiation 504 at wavelengths other than the wavelengths of forward radiation 202. In this case, a wavelength-dependent directional coupler may couple radiation 504 into optical frequency converter 108 without coupling forward radiation 202 into waveguide 502. Alternatively, additional radiation 506 may be coupled into optical frequency converter 108 at a location where forward radiation 202 is depleted. In this case, additional radiation 506 may include wavelengths present in forward radiation 202, since coupling of (depleted) forward radiation 202 to waveguide 502 would not be of significant concern. Additional pumping of optical frequency converter 108 may also be provided by bi-directional pumping (e.g., providing additional combined radiation (not shown) to endface 210 of optical frequency converter 108 on FIG. 2).

FIGS. 1-5, discussed herein, relate to standing wave feedback configurations where the feedback power propagates backward along the same path followed by the input power. However, in various embodiments, traveling wave feedback configurations may be used. In a traveling wave feedback configuration, the feedback re-enters the gain medium at a location different from the location at which the input power is emitted from. Such traveling wave feedback is considered in the following numerical example.

Figure 6A:
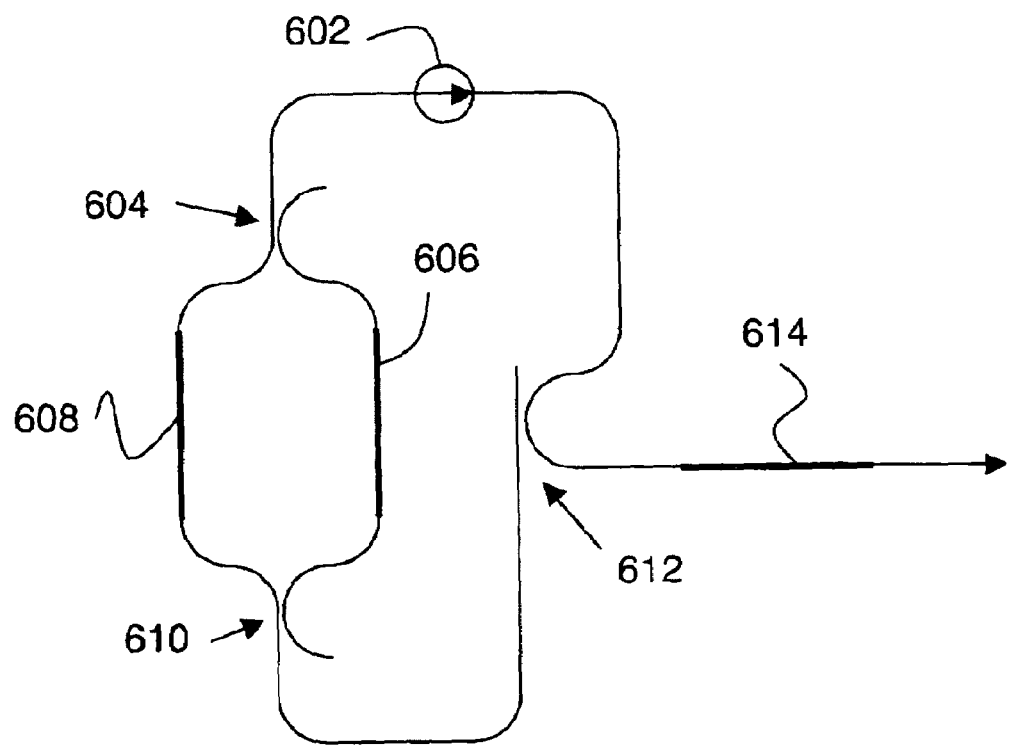
FIGS. 6A-6B illustrate traveling wave feedback configurations for a comparison between linear feedback (shown in FIG. 6A) and nonlinear feedback (shown in FIG. 6B), according to an embodiment of the invention.
Figure 6B:
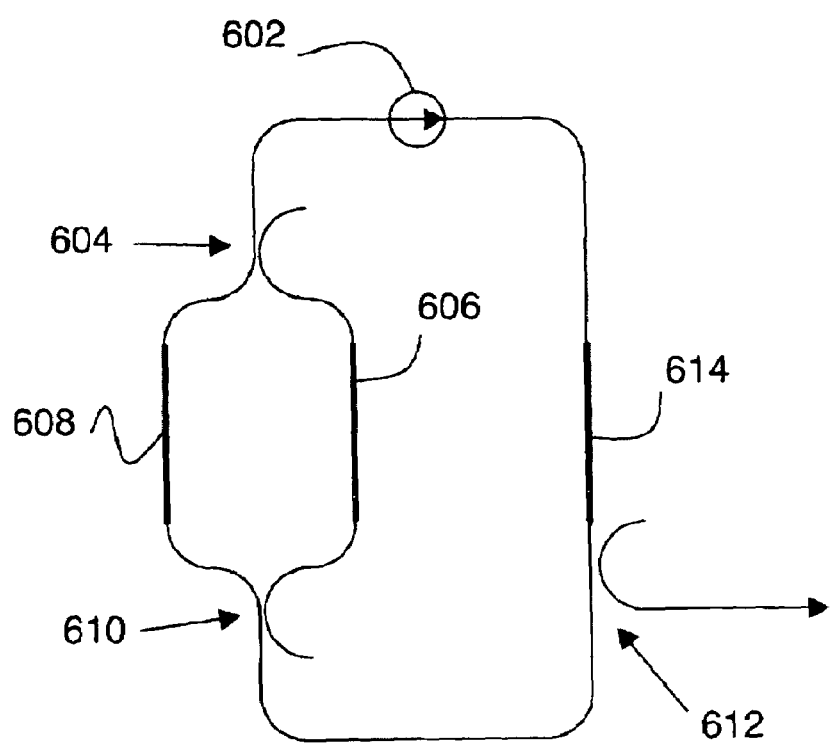

FIGS. 6A-6B illustrate traveling wave feedback configurations for a comparison between linear feedback (shown in FIG. 6A) and nonlinear feedback (shown in FIG. 6B), according to an embodiment of the invention.

FIG. 6A illustrates a unidirectional ring laser configuration having linear feedback to the gain elements. More specifically, gain elements 606 and 608 are coupled by wavelength selective couplers 604 and 610 such that they operate at distinct wavelengths. An isolator 602 ensures unidirectional propagation in the ring. A tap 612 directs a fraction of the circulating power toward a wavelength conversion device 614, and directs the remaining circulating power toward gain elements 606 and 608. Since this remaining power does not depend on the efficiency of wavelength conversion device 614, the feedback is linear in this case.

The configuration of FIG. 6B is similar to that of FIG. 6A, except that in FIG. 6B the wavelength conversion device 614 is part of the ring, and tap 612 directs wavelength converted power out of the ring, and the circulating pump power is directed back to gain elements 606 and 608. Since the pump power at tap 612 depends on the efficiency of wavelength conversion device 614, the feedback is nonlinear in this case.

The gain elements may, for example, be modeled with a standard rate equation model, and sum frequency generation (SFG) and SHG in wavelength conversion device 614 are accounted for. Assume the following numerical parameters for the purposes of illustration. Each gain element has an unsaturated gain of 30 dB, a loss of 20 dB, a unity gain power of 1 W and a length of 2 mm. The two wavelengths of operation are 1064 nm and 1063 nm. In FIG. 6A, tap 612 output couples 91.7% of the circulating power to wavelength conversion device 614, which maximizes the power provided. With this configuration, each gain element provides 771 mW of light. In FIG. 6B, tap 612 is assumed to output couple all frequency converted light and is assumed to return all pump light to wavelength selective coupler 610. The effective nonlinear coefficients in wavelength conversion device 614 on FIG. 6A for SFG and SHG are assumed to be 0.761 pm/V, which provides 50% total conversion efficiency (i.e., including both SFG and SHG) when wavelength conversion device 614 is taken to be a 1 cm long waveguide of quasi-phasematched near-stoichiometric lithium tantalate with a 10 $\mu m^2$ mode area. Wavelength conversion device 614 in FIG. 6B has nonlinear coefficients about twice that of wavelength conversion device 614 in FIG. 6A, in order to optimize the nonlinear output coupling of FIG. 6B.

Quasi-phasematched devices rely on formation of a specific domain pattern to provide a large effective nonlinearity. Process induced variations in such domain patterns may therefore lead to large part to part variation in nonlinear optical properties. For example, the effective nonlinearity for SFG in a waveguide may be degraded relative to the effective nonlinearity for SHG. The following example uses the values assumed above and shows how the effect of such a variation may be mitigated by nonlinear feedback according to the invention.

Figure 7:
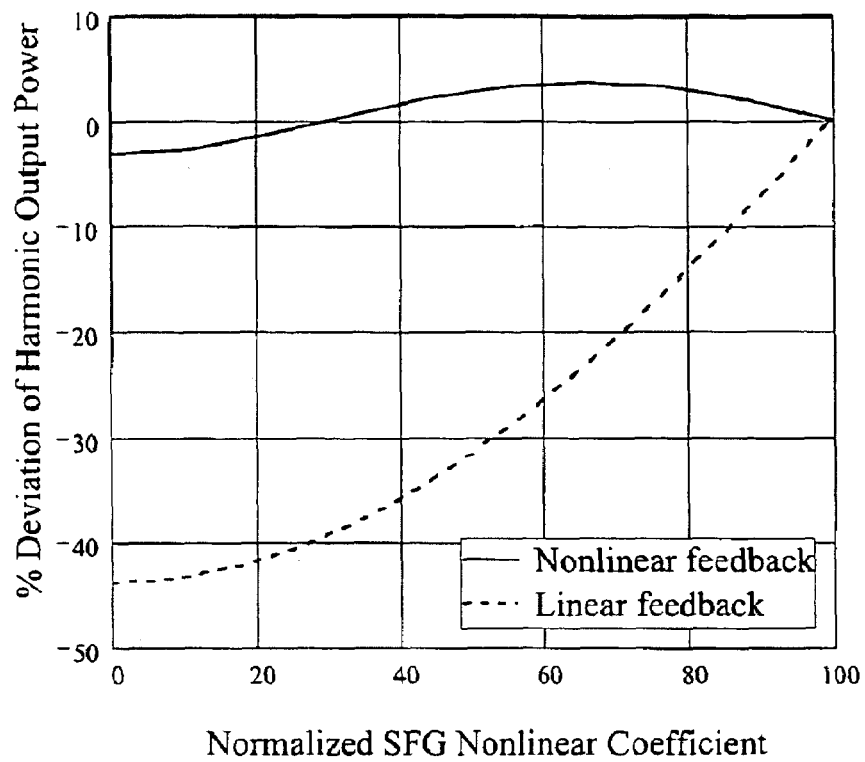
FIG. 7 is a graph of total nonlinear output power vs. normalized sum frequency generation nonlinear coefficient for the configurations of FIGS. 6A-6B.

FIG. 7 is a graph of total nonlinear output power vs. normalized sum frequency generation nonlinear coefficient for the configurations of FIGS. 6A-6B. The total nonlinear output power of FIG. 7 is the combined power due to SHG of the 1064 nm pump, SHG of the 1063 nm pump, and SFG from both pumps. The case of linear feedback (FIG. 6A) is shown with a dotted line, and nonlinear feedback (FIG. 6B) is shown with a solid line. In the linear feedback case, decreasing the SFG nonlinearity causes a significant decrease in output power. In the nonlinear feedback case, the nonlinear power does not significantly decrease as the SFG coefficient is decreased. The reason for the difference is that in the nonlinear case, unused pump power is returned to the gain elements, while in the linear case, unused pump power is simply lost. More specifically, decreasing the SFG coefficient in wavelength conversion device 614 on FIG. 6A causes the amount of pump power exiting from wavelength conversion device 614 to increase. Since this extra pump power does not remain within the laser, it is lost. In contrast, decreasing the SFG coefficient in wavelength conversion device 614 on FIG. 6B causes the amount of pump power exiting from wavelength conversion device 614 to increase, which in turn leads to increased feedback power to wavelength selective coupler 610. In this case, the extra pump power remains within the laser, thereby increasing the circulating pump power. Increasing the circulating pump power increases the efficiency of the nonlinear processes, and thereby leads to reduced sensitivity to variation in nonlinear coefficient as shown on FIG. 7.

Figure 8:
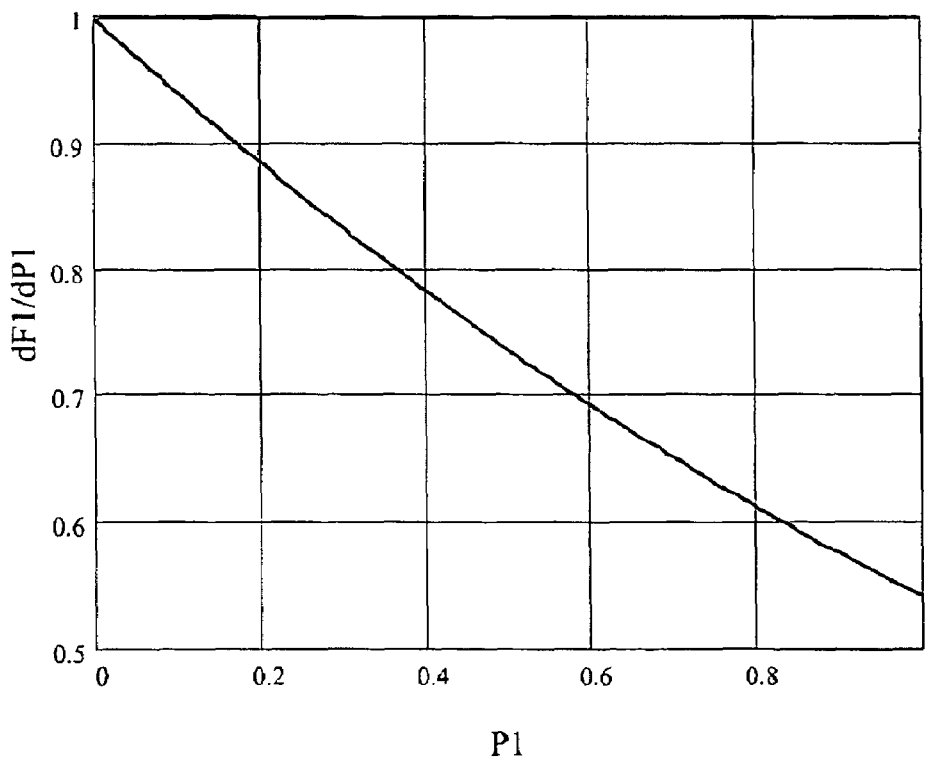
FIG. 8 is a graph illustrating the dependence of the feedback derivative on power for the example of FIG. 6B.

FIG. 8 is a graph illustrating the dependence of the feedback derivative on power for the example of FIG. 6B. As indicated above, the partial derivative of feedback power with respect to input power is one way to quantify nonlinear feedback. In the calculation of FIG. 8, the output power of one of the sources is set to zero, and the dependence of feedback derivative on input power to the converter is plotted. Similar results would be obtained if the calculation were performed with one of the lasers at a non-zero operating point. As P1 increases, the derivative $\partial F1/\partial P1$ decreases, because of SHG in wavelength conversion device 614. This decrease in the feedback derivative as power increases is a general feature of nonlinear feedback in various embodiments of the invention.

In this case, nonlinear feedback results in a decreasing feedback derivative with increasing input power, creating a power limiting function (e.g., as shown on FIG. 3). If the effective nonlinear coefficient in fabricated parts is lower than the design target, feedback F1 increases which increases input power P1. When two or more lasers are power combined, reductions in an effective nonlinear coefficient for a process driven by P1 results in increased circulating power at P1 which may drive other nonlinear processes driven by P1 more efficiently, for example, as shown in FIG. 7, where reduction of an SFG coefficient increased circulating pump power with a corresponding increase in SHG efficiency. Nonlinear feedback thus provides wavelength conversion that is much less sensitive to variations in effective nonlinear coefficient than a linear feedback arrangement. Such reduced sensitivity may reduce fabrication cost of a wavelength converter, such as optical frequency converter 108 described with reference to FIG. 1, by increasing yield, since the requirements placed on the wavelength converter effective nonlinear coefficients may be, relaxed.

Figure 9:
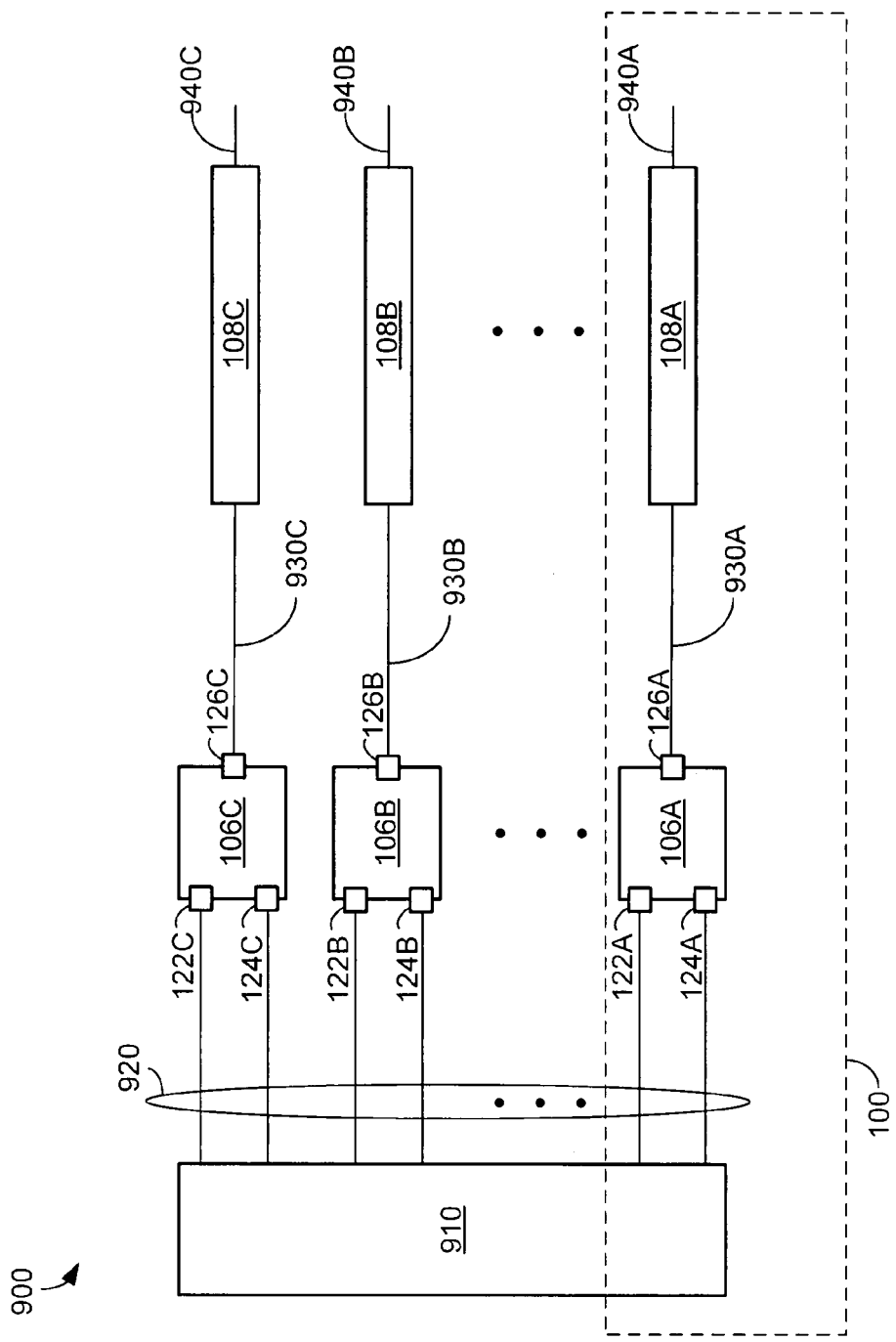
FIG. 9 is a block diagram of a compound illumination module, according to another embodiment of the invention.

FIG. 9 is a block diagram of a compound illumination module, according to another embodiment of the invention. Compound illumination module 900 comprises one or more illumination modules 100 described with reference to FIG. 1. Although FIG. 9 illustrates compound illumination module 900 including three illumination modules 100 for simplicity, compound illumination module 900 may include more or fewer illumination modules 100.

Optical source array 910 may include one or more optical sources 102 described with reference to FIG. 1. In various embodiments, the optical source array 910 may be an array of laser diodes, a diode laser array, and/or a semiconductor laser array. The optical sources may be configured to emit optical radiation within the infrared spectrum, i.e., with a wavelength shorter than radio waves and longer than visible light. The optical source array 910 is coupled to optical source output waveguides 920, which are configured to propagate the optical radiation emitted by the optical source array 910.

The optical source output waveguides 920 are coupled to the combiners 106A-C, and are configured both to propagate the optical radiation from the optical source array 910 to the combiners 106A-C and also the source feedback radiation from the combiners 106A-C to the respective optical sources in the optical source array 910.

The optical source output waveguides 920, combined optical waveguides 930A-C, and converters 108A-C may be fabricated on a single substrate as a planar lightwave circuit, and may comprise silicon oxynitride waveguides and/or lithium tantalate waveguides.

Each combiner 106A-C may be configured to selectively couple feedback radiation received from a respective converter 108A-C to the respective optical source, such that each respective optical source receives a source feedback radiation. The source feedback radiation may enable the optical source to operate at a wavelength determined by characteristics of the source feedback radiation, such that each optical source may operate at a different wavelength. This configuration may produce reduced or substantially eliminated speckle from the combined radiation.

The combined optical waveguides 930A-C are coupled to the combiners 106A-C and provide combined radiation to converters 108A-C and feedback radiation to combiners 106A-C, respectively. Converters 108A-C may comprise nonlinear optical (NLO) elements such as, for example, an optical parametric oscillator elements or quasi-phase matched optical elements.

Compound illumination module 900 may produce output optical radiation at a plurality of wavelengths. The plurality of wavelengths may be within the visible spectrum, i.e., with a wavelength shorter than infrared and longer than ultraviolet light. For example, waveguide 940A may provide output optical radiation between about 450 nm and about 470 nm, waveguide 940B may provide output optical radiation between about 525 nm and about 545 nm, and waveguide 940C may provide output optical radiation between about 615 nm and about 660 nm. These ranges of output optical radiation may be selected to provide visible wavelengths (for example, blue, green and red wavelengths, respectively) that are pleasing to a human viewer. Furthermore, the ranges described herein may be combined to produce a white light output.

The output optical radiation produced by the compound illumination module 900 may have substantially reduced or no speckle. In some embodiments, the output optical radiation may produce an optical power in a range between approximately 1 watt and approximately 20 watts. In some embodiments, the output optical radiation produced by the compound illumination module 900 may have a substantially flat phase front.

Figure 10:
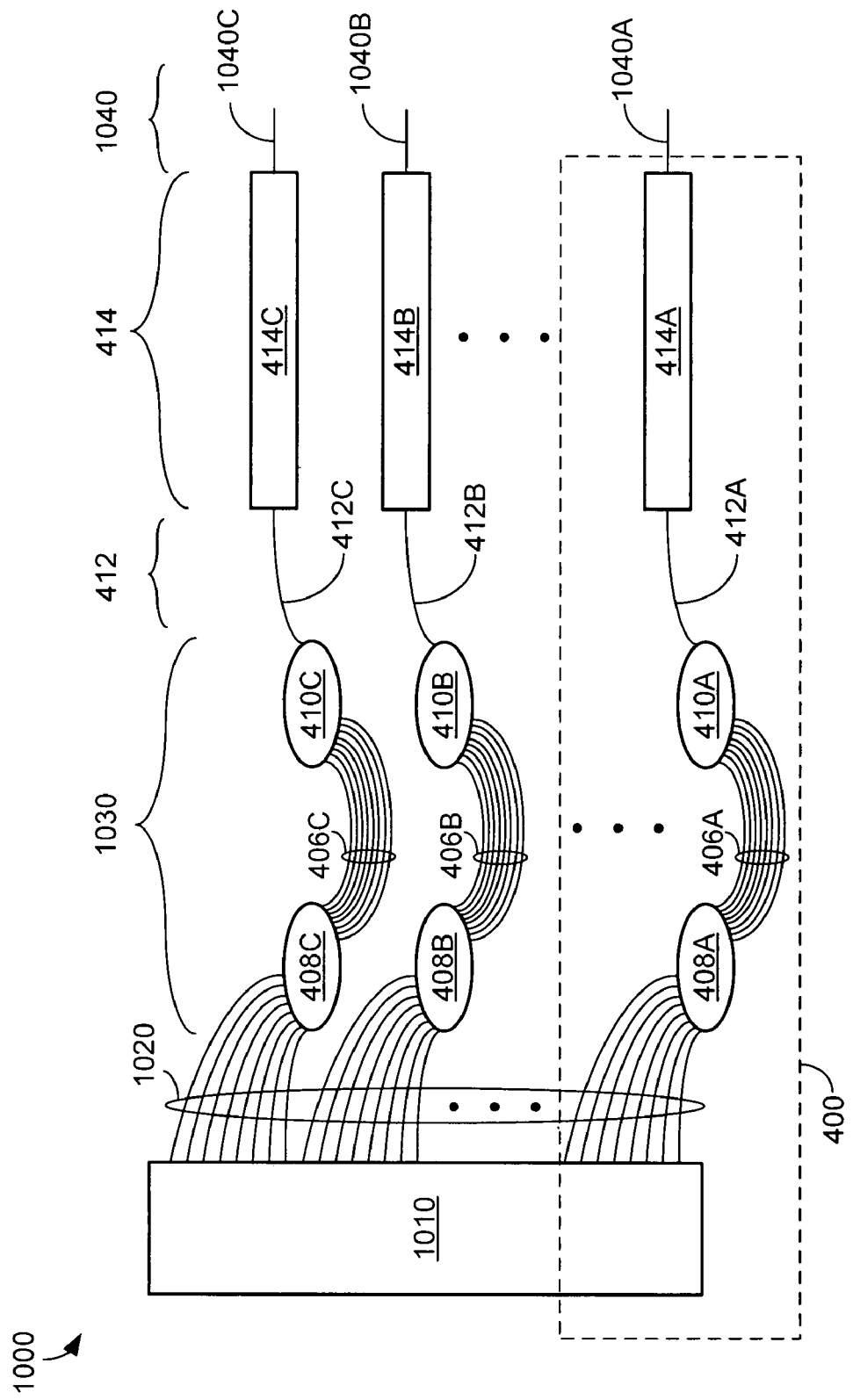
FIG. 10 is a block diagram of a compound laser illumination module, according to another embodiment of the invention.

FIG. 10 is a block diagram of a compound laser illumination module, according to another embodiment of the invention. Compound laser illumination module 1000 comprises one or more laser illumination modules 400 described with reference to FIG. 4. Although FIG. 10 illustrates compound laser illumination module 1000 including three laser illumination modules 400 for simplicity, compound laser illumination module 1000 may include more or fewer laser illumination modules 400. An array of diode lasers 1010 may include one or more arrays of diode lasers 402 described with reference to FIG. 4. In various embodiments, the array of diode lasers 1010 may be an array of laser diodes, a diode laser array, and/or a semiconductor laser array. The array of diode lasers 1010 may be configured to emit optical radiation within the infrared spectrum, i.e., with a wavelength shorter than radio waves and longer than visible light.

Laser array output waveguides 1020 couple to the diode lasers in the array of diode lasers 1010 and directs the outputs of the array of diode lasers 1010 to star couplers 408A-C. The laser array output waveguides 1020, the arrayed waveguide gratings 1030, and the optical frequency converters 414A-C may be fabricated on a single substrate using a planar lightwave circuit, and may comprise silicon oxynitride waveguides and/or lithium tantalate waveguides.

Arrayed waveguide gratings 1030 comprise the star couplers 408A-C, waveguides 406A-C, and star couplers 410A-C. Waveguides 412A-C provide combined radiation to optical frequency converters 414A-C and feedback radiation to star couplers 410A-C, respectively.

Optical frequency converters 414A-C may comprise nonlinear optical (NLO) elements, for example optical parametric oscillator elements and/or quasi-phase matched optical elements.

Compound laser illumination module 1000 may produce output optical radiation at a plurality of wavelengths. The plurality of wavelengths may be within a visible spectrum, i.e., with a wavelength shorter than infrared and longer than ultraviolet light. For example, waveguide 1040A may similarly provide output optical radiation between about 450 nm and about 470 nm, waveguide 1040B may provide output optical radiation between about 525 nm and about 545 nm, and waveguide 1040C may provide output optical radiation between about 615 nm and about 660 nm. These ranges of output optical radiation may again be selected to provide visible wavelengths (for example, blue, green and red wavelengths, respectively) that are pleasing to a human viewer, and may again be combined to produce a white light output.

The waveguides 1040A-C may be fabricated on the same planar lightwave circuit as the laser array output waveguides 1020, the arrayed waveguide gratings 1030, and the optical frequency converters 414A-C. In some embodiments, the output optical radiation provided by each of the waveguides 1040A-C may provide an optical power in a range between approximately 1 watts and approximately 20 watts.

The optical frequency converter 414 may comprise a quasi-phase matching wavelength-converting waveguide configured to perform second harmonic generation (SHG) on the combined radiation at a first wavelength, and generate radiation at a second wavelength. A quasi-phase matching wavelength-converting waveguide may be configured to use the radiation at the second wavelength to pump an optical parametric oscillator integrated into the quasi-phase matching wavelength-converting waveguide to produce radiation at a third wavelength, the third wavelength optionally different from the second wavelength. The quasi-phase matching wavelength-converting waveguide may also produce feedback radiation propagated via waveguide 412 through the arrayed waveguide grating 1030 to the array of diode lasers 1010, thereby enabling each laser disposed within the array of diode lasers 1010 to operate at a distinct wavelength determined by a corresponding port on the arrayed waveguide grating.

For example, compound laser illumination module 1000 may be configured using an array of diode lasers 1010 nominally operating at a wavelength of approximately 830 nm to generate output optical radiation in a visible spectrum corresponding to any of the colors red, green, or blue.

Compound laser illumination module 1000 may be optionally configured to directly illuminate spatial light modulators without intervening optics, such as beam steering element 1100 discussed with reference to FIG. 11, below. In some embodiments, compound laser illumination module 1000 may be configured using an array of diode lasers 1010 nominally operating at a single first wavelength to simultaneously produce output optical radiation at multiple second wavelengths, such as wavelengths corresponding to the colors red, green, and blue. Each different second wavelength may be produced by an instance of laser illumination module 400.

The compound laser illumination module 1000 may be configured to produce diffraction-limited white light by combining output optical radiation at multiple second wavelengths into a single waveguide using, for example, waveguide-selective taps (not shown).

The array of diode lasers 1010, laser array output waveguides 1020, arrayed waveguide gratings 1030, waveguides 412, optical frequency converters 414, and frequency converter output waveguides 1040 may be fabricated on a common substrate using fabrication processes such as coating and lithography.

Figure 11:
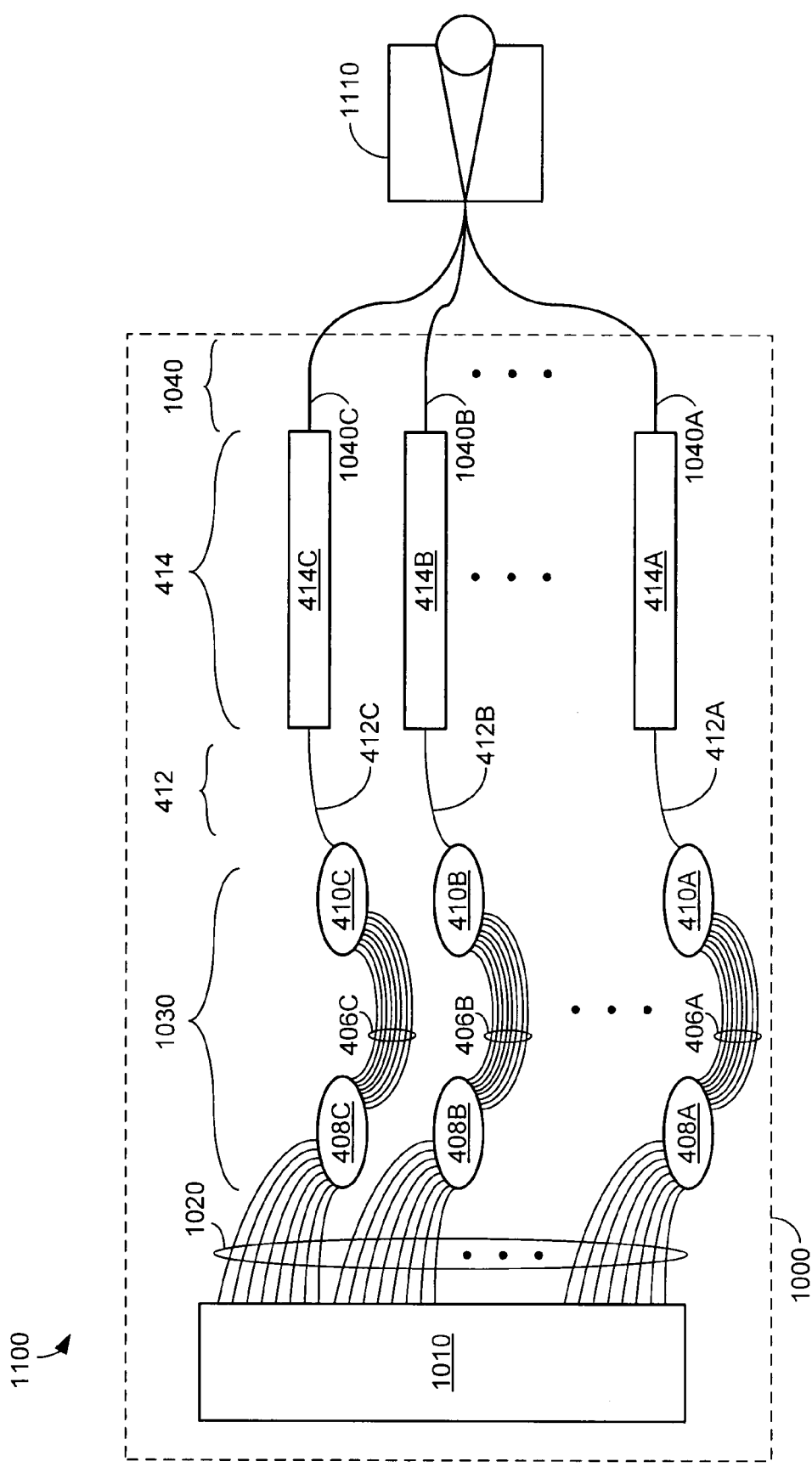
FIG. 11 is a block diagram of a laser illumination system, according to another embodiment of the invention.

FIG. 11 is a block diagram of a laser illumination system, according to another embodiment of the invention. Laser illumination system 1100 comprises compound laser illumination module 1000 of FIG. 10 and beam shaping element 1110. In an alternative embodiment, compound laser illumination module 1000 may be replaced by compound illumination module 900. The beam shaping element 1110 is coupled to the compound laser illumination module 1000 by waveguides 1040A-C, described with reference to FIG. 10.

Beam shaping element 1110 may be disposed on a same substrate as the compound laser illumination module 1000. The substrate may, for example, comprise a thermally conductive material, a semiconductor material, or a ceramic material. The substrate may comprise copper-tungsten, silicon, gallium arsenide, lithium tantalate, silicon oxynitride, and/or gallium nitride, and may be processed using semiconductor manufacturing processes including coating, lithography, etching, deposition, and implantation.

Some of the described elements, such as the array of diode lasers 1010, laser array output waveguides 1020, arrayed waveguide gratings 1030, waveguides 412, optical frequency converters 414, waveguides 1040, beam shaping element 1110, and various related planar lightwave circuits may be passively coupled and/or aligned, and in some embodiments, passively aligned by height on a common substrate. Each of the waveguides 1040A-C may couple to a different instance of beam shaping element 1110, rather than to a single element as shown.

Beam shaping element 1110 may be configured to shape the output optical radiation from waveguides 1040A-C into an approximately rectangular diffraction-limited optical beam, and may further configure the output optical radiation from waveguides 1040A-C to have a brightness uniformity greater than approximately 95% across the approximately rectangular beam shape.

The beam shaping element 1110 may comprise an aspheric lens, such as a "top-hat" microlens, a holographic element, or an optical grating. In some embodiments, the diffraction-limited optical beam output by the beam shaping element 1110 produces substantially reduced or no speckle. The optical beam output by the beam shaping element 1110 may provide an optical power in a range between approximately 1 watt and approximately 20 watts, and a substantially flat phase front.

Figure 12:
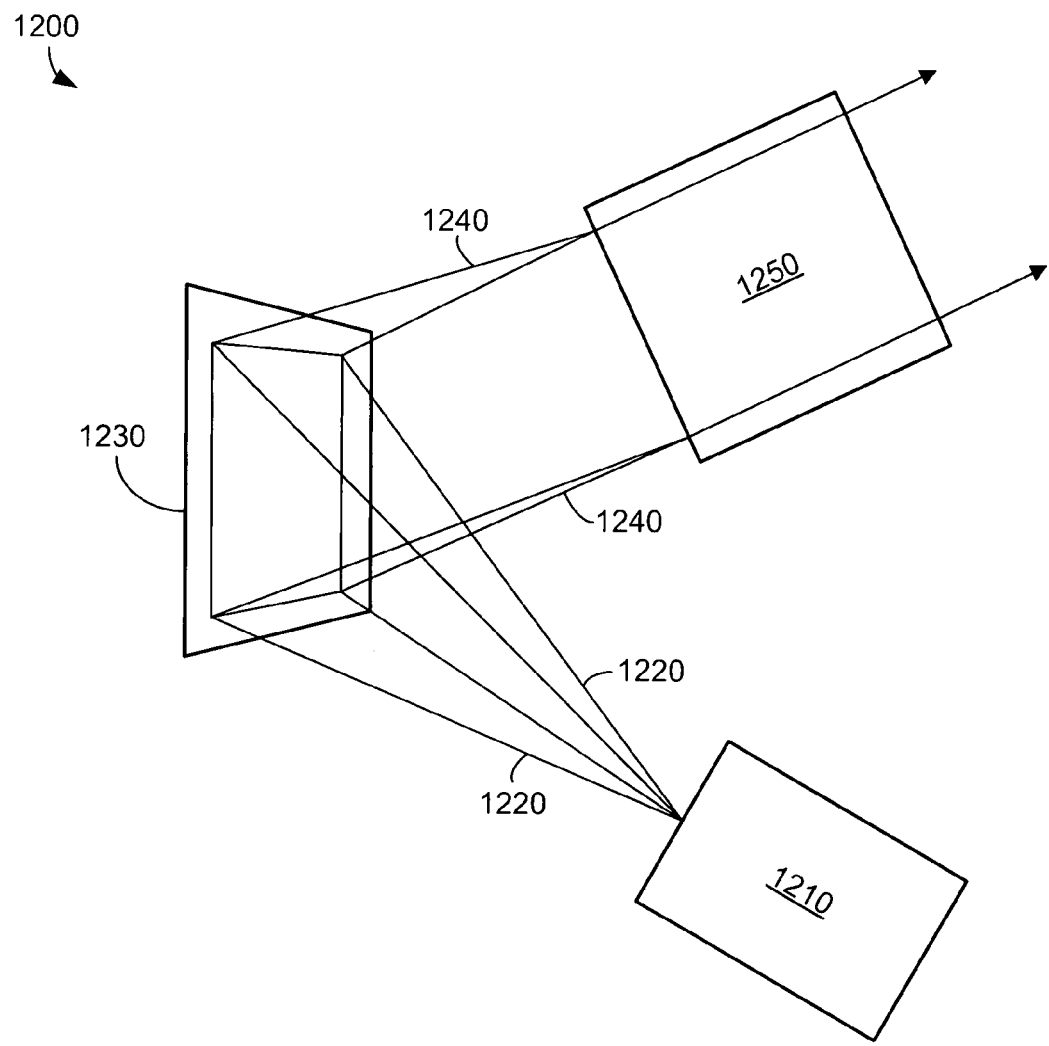
FIG. 12 is a block diagram of an imaging system, according to an embodiment of the invention.

FIG. 12 is a block diagram of an imaging system, according to an embodiment of the invention. Imaging system 1200 comprises light engine 1210, optical beams 1220, spatial light modulator 1230, modulated optical beams 1240, and projection lens 1250. The light engine 1210 may be a compound optical illumination module 900, described with reference to FIG. 9, a compound laser illumination module 1000, described with reference to FIG. 10, or a laser illumination system 1100, described with reference to FIG. 11. Spatial light modulator 1230 may be a 3LCD system, a DLP® system, a LCoS system, a transmissive liquid crystal display, a liquid-crystal-on-silicon array, a grating-based light valve, or other micro-display or micro-projection system.

The spatial light modulator 1230 may be configured to spatially modulate the optical beam 1220. The spatial light modulator 1230 may be coupled to electronic circuitry configured to cause the spatial light modulator 1230 to modulate a video image, such as may be displayed by a television or a computer monitor, onto the optical beam 1220 to produce a modulated optical beam 1240. In some embodiments, modulated optical beam 1240 may be output from the spatial light modulator on a same side as the spatial light modulator receives the optical beam 1220, using optical principles of reflection. In other embodiments, modulated optical beam 1240 may be output from the spatial light modulator on an opposite side as the spatial light modulator receives the optical beam 1220, using optical principles of transmission. The modulated optical beam 1240 may optionally be coupled into a projection lens 1250. The projection lens 1250 is typically configured to project the modulated optical beam 1240 onto a display, such as a video display screen.

Figure 13:
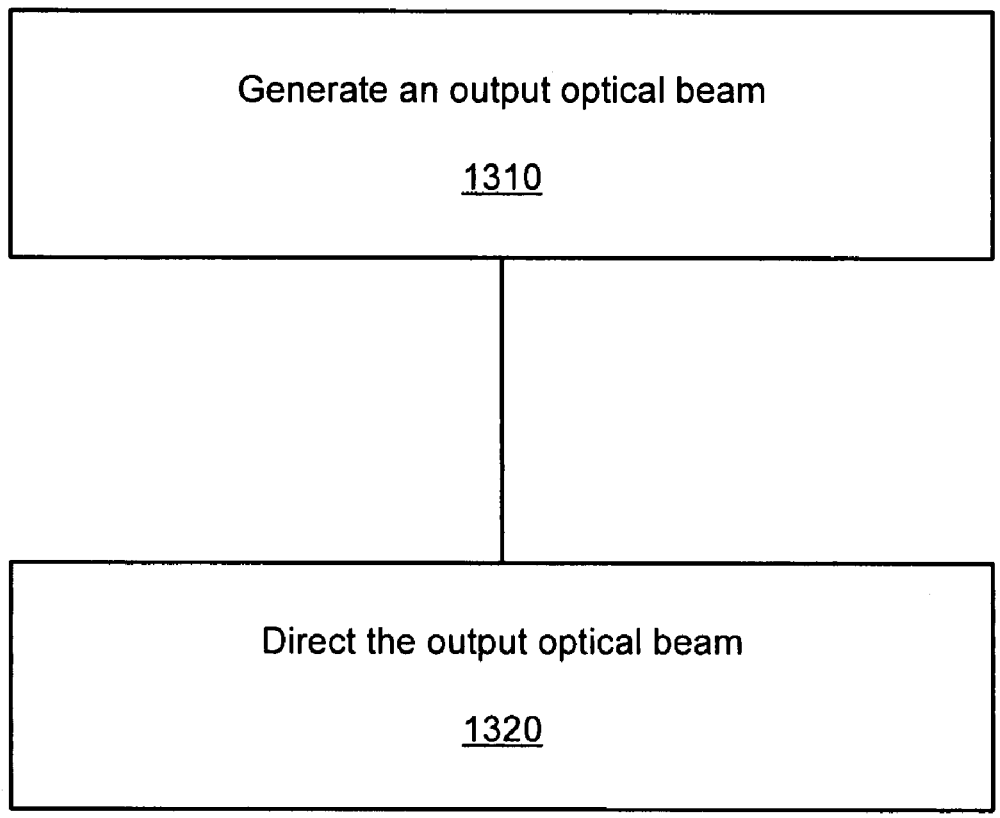
FIG. 13 illustrates a method of illuminating a video display, according to an embodiment of the invention.

FIG. 13 illustrates a method of illuminating a video display, according to an embodiment of the invention. The method may be performed using a compound illumination module 900, a compound laser illumination module 1000, a laser illumination system 1100, or an imaging system 1200.

In step 1310, a diffraction-limited output optical beam is generated using compound illumination module 900, compound laser illumination module 1000, laser illumination system 1100 or light engine 1210.

In step 1320, the output optical beam is directed using a spatial light modulator, such as spatial light modulator 1230, and optionally projection lens 1250. The spatial light modulator may project an image onto a display, such as a video display screen.

Several embodiments are illustrated and/or described herein. However, it will be appreciated that modifications and variations are covered by the above teachings and within the scope of the appended claims without departing from the spirit and intended scope thereof. For example, an illumination module may be configured to emit any number of wavelengths including one, two, three, four, five, six, or more, the wavelengths spaced apart by varying amounts, and having equal or unequal power levels. An illumination module may be configured to emit a single wavelength per optical beam, or multiple wavelengths per optical beam. An illumination module may also comprise additional components and functionality including polarization controller, polarization rotator, power supply, power circuitry such as power FETs, electronic control circuitry, thermal management system, heat pipe, and safety interlock. In some embodiments, an illumination module may be coupled to an optical fiber or a lightguide.

The embodiments discussed herein are illustrative of the present invention. As these embodiments are described with reference to illustrations, various modifications or adaptations of the methods or specific elements described may become apparent to those skilled in the art. All such modifications, adaptations, or variations that rely on the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A system comprising:
   a laser configured to produce an optical beam at a first wavelength;
   a planar lightwave circuit coupled to the laser and configured to guide the optical beam; and
   a waveguide optical frequency converter coupled to the planar lightwave circuit, and configured to receive the optical beam at the first wavelength, convert the optical beam at the first wavelength into an output optical beam at a second wavelength, and provide optically coupled feedback which is nonlinearly dependent on the power of the optical beam at the first wavelength to the laser.

2. The system of claim 1 wherein the laser comprises a semiconductor laser.

3. The system of claim 1 wherein the first wavelength is within an infrared range.

4. The system of claim 1 wherein the planar lightwave circuit comprises an arrayed waveguide grating.

5. The system of claim 4 wherein the arrayed waveguide grating comprises a silicon oxynitride waveguide.

6. The system of claim 1 wherein the waveguide optical frequency converter comprises a lithium tantalate waveguide.

7. The system of claim 1 wherein the waveguide optical frequency converter comprises an optical parametric oscillator.

8. The system of claim 1 wherein the waveguide optical frequency converter comprises a quasi-phase matched optical element.

9. The system of claim 1 wherein the second wavelength is a visible wavelength.

10. The system of claim 9 wherein the second wavelength is within a range selected from the group consisting of a range from about 450 nm to about 470 nm, a range from about 525 nm to about 545 nm, and a range from about 615 nm to about 660 nm.

11. The system of claim 1 further comprising a beam shaping element configured to shape the output optical beam from the waveguide optical frequency converter into a diffraction-limited optical beam having a brightness uniformity greater than approximately 95% across an approximately rectangular beam shape.

12. The system of claim 11 wherein the diffraction-limited optical beam is configured to have an optical power between approximately 1 watt and approximately 20 watts.

13. The system of claim 11 wherein the beam shaping element comprises an aspheric lens.

14. The system of claim 11 wherein the beam shaping element comprises an optical grating.

15. The system of claim 11 further comprising a spatial light modulator configured to modulate the diffraction-limited optical beam.

16. The system of claim 15 wherein the spatial light modulator comprises a micro-electro-mechanical system.

17. The system of claim 15 wherein the spatial light modulator comprises a liquid crystal device.

18. A system comprising:
    a substrate;
    a laser diode array disposed on the substrate and configured to emit a plurality of optical beams at a first wavelength;
    a planar lightwave circuit disposed on the substrate and coupled to the laser diode array, and configured to combine the plurality of optical beams and produce a combined optical beam at the first wavelength; and a nonlinear optical element disposed on the substrate and coupled to the planar lightwave circuit, and configured to:
  convert the combined optical beam at the first wavelength into an optical beam at a second wavelength using nonlinear frequency conversion, and
  provide optically coupled feedback which is nonlinearly dependent on a power of the combined optical beam at the first wavelength to the laser diode array.

19. The system of claim 18 further comprising a beam shaping element coupled to the nonlinear optical element, the beam shaping element configured to shape the optical beam at the second wavelength into an approximately rectangular diffraction-limited optical beam.

20. The system of claim 18 wherein the planar lightwave circuit comprises an arrayed waveguide grating.

21. The system of claim 18 wherein the nonlinear optical element comprises a quasi-phase matched optical waveguide.

22. The system of claim 18 wherein the nonlinear optical element comprises an optical parametric oscillator.

23. The system of claim 18 wherein the second wavelength is within a range selected from the group consisting of a range from about 450 nm to about 470 nm, a range from about 525 nm to about 545 nm, and a range from about 615 nm to about 660 nm.

24. A system comprising:
a semiconductor laser array configured to produce a plurality of optical beams at a first wavelength;
an arrayed waveguide grating coupled to the semiconductor laser array and configured to combine the plurality of optical beams and output a combined optical beam at the first wavelength;
a quasi-phase matching wavelength-converting waveguide coupled to the arrayed waveguide grating and configured to use second harmonic generation to produce an output optical beam at a second wavelength based on the combined optical beam at the first wavelength.

25. A method for illuminating a video display, the method comprising:
generating a diffraction-limited output optical beam using a system comprising
  a laser diode array disposed on a substrate and configured to emit a plurality of optical beams at a first wavelength,
  a planar lightwave circuit disposed on the substrate and coupled to the laser diode array, and configured to combine the plurality of optical beams and produce a combined optical beam at the first wavelength,
  a nonlinear optical element disposed on the substrate and coupled to the planar lightwave circuit, and configured to convert the combined optical beam at the first wavelength into an optical beam at a second wavelength using nonlinear frequency conversion, and provide optically coupled feedback which is nonlinearly dependent on a power of the combined optical bean at the first wavelength to the laser diode array, and
  a beam shaping element coupled to the nonlinear optical element and configured to shape the optical beam at the second wavelength into a diffraction-limited output optical beam; and
directing the diffraction-limited output optical beam using a spatial light modulator which is configured to project an image to a display screen.

* * * * *